United States Patent
Shanbhag

(10) Patent No.: US 6,314,107 B1
(45) Date of Patent: Nov. 6, 2001

(54) METHOD AND APPARATUS FOR ASSIGNING SPREADING CODES

(75) Inventor: Abhijit G. Shanbhag, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/176,740

(22) Filed: Oct. 20, 1998

(51) Int. Cl.$^7$ .................................................. H04B 7/216

(52) U.S. Cl. ................................... 370/441; 375/130

(58) Field of Search ................................ 370/441, 320, 370/335, 339, 342, 328, 252, 277, 333, 338, 479; 375/130, 140, 142, 150, 139, 143

(56) References Cited

U.S. PATENT DOCUMENTS

| | | | |
|---|---|---|---|
| 5,619,526 | * 4/1997 | Kim et al. | 370/335 |
| 5,691,974 | * 11/1997 | Zehavi et al. | 370/208 |
| 5,757,767 | * 5/1998 | Zehavi | 451/45 |
| 5,815,526 | * 9/1998 | Rice | 375/146 |
| 5,910,950 | * 6/1999 | Ten Brink | 370/342 |
| 5,940,434 | * 8/1999 | Lee et al. | 375/146 |
| 6,009,089 | * 12/1999 | Huang et al. | 370/342 |
| 6,028,884 | * 2/2000 | Silberger et al. | 375/130 |

FOREIGN PATENT DOCUMENTS 9503652   2/1995   (WO) .

OTHER PUBLICATIONS

Bharghavan, V. "A Dynamic Addressing Scheme for Wireless Media Access" IEEE pp. 756–760 (1995).

Braithwaite, R. Neil "Nonlinear Amplification of CDMA Waveforms: An Analysis of Power Amplifier Gain Errors and Spectral Regrowth" 48$^{th}$ IEEE Vehicular Technology Conference, Canada, May 18–21, 1998, pp. 2160–2166.

* cited by examiner

Primary Examiner—Dang Ton
Assistant Examiner—Phirin Sam
(74) Attorney, Agent, or Firm—Philip R. Wadsworth; Abdollah Katbab; Bruce Greenhaus

(57) ABSTRACT

A method is taught for transmitting message signals in a communication system having a new call entering tile communication system and Walsh codes that can be active and inactive. The method includes dividing the Walsh codes into bins and determining the number of active Walsh codes in the bins. Selecting a Walsh code in accordance with the Walsh code number determination and assigning the selected Walsh code to the new call are set forth. The Walsh codes have indices and the Walsh codes are divided into bins according to the indices. The Walsh codes are divided into cycles according to the indices and if the number of bins is n the Walsh codes are divided into bins in accordance with the value of their indices modulo n. The minimum number of active Walsh codes in the bins is determined and the Walsh code is selected in accordance with the minimum number of active codes. A plurality of the bins can contain the minimum number of active Walsh codes. The method also sets forth selecting a bin of the plurality of bins containing the minimum number of active Walsh codes and selecting a Walsh code from the selected bin. A subset of the bins containing the minimum number of active Walsh codes is selected and a first predetermined bin with a preference lower than a preference for the remaining bins of the subset of the bins is selected.

14 Claims, 11 Drawing Sheets

METHOD AND APPARATUS FOR ASSIGNING SPREADING CODES

BACKGROUND OF THE INVENTION

I. Field of the Invention

This invention relates to the field of communications systems and, in particular, to the field of transmission of message signals in a communications system.

II. Background of Invention

It is well known in the art of cellular communications systems to mix message signals to be transmitted with spreading code vectors such as Walsh code vectors. This permits the message signals to be combined, transmitted, and then separated from each other at the receiver after transmission. It is possible to separate the received signals because the spreading code vectors are orthogonal and they provide a theoretical interference of zero between the signals that are combined.

In order to perform these operations it is known to randomly assign one of the available spreading codes to each new originating call or each new handoff call added to the communications system. However, random assignment of spreading codes in this manner may result in large peaks in the transmit power level of the combined signals.

A serious consequence of the power level peaks is that the power amplifier that amplifies the combined signals can be temporarily driven into a nonlinear region and saturated, thus, distorting the input signal. This can cause interference between the combined signals, particularly between signals on adjacent channels. The interference between the combined signals can cause degradation of the separated and recovered signals.

This problem can be solved by providing a power amplifier with an increased capacity. Such a power amplifier is not driven into its nonlinear region by the peaks in the power level of the combined signals. However, this is an expensive and inefficient solution to the problem because the increased capacity of the power amplifier is not used during the remaining ninety-nine percent of the time.

Thus, it is desirable to provide a system and method for smoothing the transmit power level of the combined signals caused by random assignment of spreading codes in order to cause fewer peaks and drive the power amplifier into its nonlinear region less frequently.

SUMMARY OF THE INVENTION

A method is taught for transmitting message signals in a communication system. The disclosed method applies, in particular, to the assignment of spreading codes (such as Walsh codes) to new calls entering the communication system. As a matter of convenience, the discussion below will consider the Walsh code as the choice for spreading code, although the ideas are easily extensible for any other spreading code. The method includes dividing the Walsh codes into bins and determining the number of active Walsh codes in the bins. Selecting a Walsh code in accordance with the Walsh code number determination and assigning the selected Walsh code to the new call are set forth. The Walsh codes have indices and the Walsh codes are divided into bins according to the indices. The Walsh codes are divided into cycles according, to the indices and if the number of bins is n the Walsh codes are divided into bins in accordance with the value of their indices modulo n. The minimum number of active Walsh codes in the bins is determined and the Walsh code is selected in accordance with the minimum number of active codes. A plurality of the bins can contain the minimum number of active Walsh codes. The method also sets forth selecting a bin of the plurality of bins containing the minimum number of active Walsh codes and selecting a Walsh code from the selected bin. A subset of the bins containing the minimum number of active Walsh codes is selected and a first predetermined bin with a preference lower than a preference for the remaining bins of the subset of the bins is selected.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein.

DETAILED DESCRIPTION OF THE INVENTION

Figure 1:
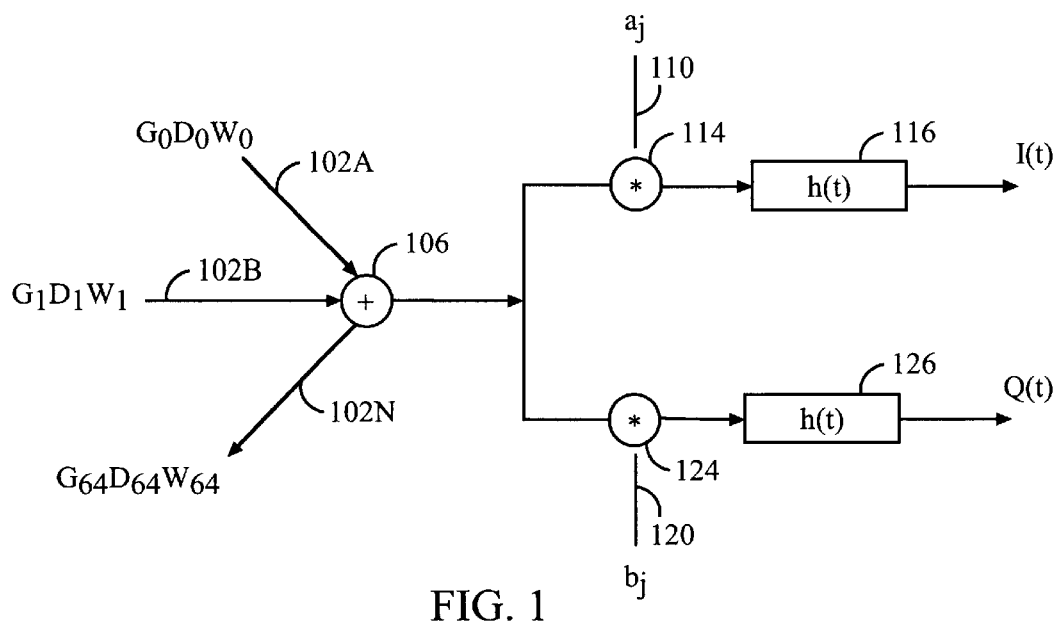
FIG. 1 shows a block diagram representation of a system for generating waveforms suitable for transmission in a communications system.

A message signal such as a Walsh signal can be represented as a vector having the components $-1/+1$. A corresponding binary spreading code such as a Walsh code can be represented as a vector having the components $0/1$. A Walsh signal will be represented as W with a subscript. The corresponding binary Walsh code of the Walsh signal can be represented by w with a subscript, for example, $w_i$. The subscript is used to represent the Walsh code index of the code vector. The ordering of the code index is assumed to be standard Hadamard ordering. It will be understood that $w_i$ can be obtained from $W_i$ by replacing each 1 within $W_i$ with a 0 and replacing each $-1$ within $W_i$ with 1.

The binary Walsh code is a linear code. Thus, if $w_i$ and $w_j$ are Walsh code vectors then $w_i+w_j$ modulo 2 is also a binary Walsh code vector. Any code vector in a linear code can be expressed as a linear combination of a smaller set of code vectors referred to as basis vectors. In particular, a binary linear code of size $2^m$ can be expressed as a linear combination of certain sets of m vectors. For example, $\{w_1, w_2, w_4, w_8, w_{16}, w_{32}\}$ can be selected as the set of basis vectors for a binary Walsh code of size 64 wherein the index is zero based. This is the type of code specified in, the industry standard for mobile communications systems, IS95.

Thus, any binary Walsh code vector can be represented as:

$$w_i = c_i w_1 + c_2 w_2 + c_4 w_4 + c_8 w_8 + c_{16} w_{16} + c_{32} w_{32}$$

where the addition is modulo 2 and $c_1, c_2, c_4, c_8, c_{16}, c_{32}$ are binary scalars that can therefore only take on the values zero or one. Each distinct selection of the binary parameters $\{c_1,$ $c_2, c_4, c_8, c_{16}, c_{32}$} out of a total of sixty-four gives a distinct binary Walsh code vector. Furthermore, the vector set {$w_1, w_2, w_4, w_8, w_{16}, w_{32}$} is only one of several possible choices of basis vectors. Another set of basis vectors can be {$w_1, w_3, w_6, w_9, w_{17}, w_{331}$} However, for the purpose of simplifying computations the choice of basis vectors is restricted herein. It will be understood by those skilled in the art that the binary Walsh code vector $w_0$ is obtained by setting each ci to zero and that $w_j+w_j=w_0$ for any code vector $w_j$.

In order to obtain the parameters $c_i$ for any Walsh code $w_j$ the integer j in its binary form is represented as:

$$j=c_1+2c_2+4c_4+8c_8+16c_{16}+32c_{32}.$$

Using this representation:

$$w_j=c_1w_1+c_2w_2+c_4w_4+c_8w_8+c_{16}w_{16}+c_{32x}w_{32}.$$

The code parameters are referred to as the components of the binary Walsh code vector $w_j$. Furthermore, in order to obtain the Walsh code index of the sum of any two Walsh code vectors $w_i$ and $w_j$ the components of $w_i$ and $w_j$ are obtained. If {$c_1, c_2, c_4, c_8, c_{16}, c_{32}$} and {$c'_1, c'_2, c'_4, c'_8, c'_{16}, c'_{32}$} are the respective components of vectors $w_i$ and $w_j$ and k is the index of the sum, then:

$$k=(c_1 \oplus c'_1)+2(c_2 \oplus c'_2)+4(c_4 \oplus c'_4)+8(c_8 \oplus c'_8)+16(c_{16} \oplus c'_{16})+32(c_{32} \oplus c'_{32})$$

where $\oplus$ denotes modulo 2 addition.

It will also be understood that addition modulo 2 of binary Walsh code vectors is equivalent to multiplication of the corresponding Walsh signals. Thus, $W_i \cdot W_j$ is also a Walsh signal and it corresponds to the binary Walsh code vector $w_i+w_j$. Hereinbelow, the dot product of Walsh signals $W_i$, $W_j$ is represented as $W_{<i,j>}$.

Another important feature of Walsh code vectors is their maximum run length. The maximum run length of a binary Walsh code vector is the maximum number of continuous zeros or ones in the code vector. One property of the ordering of Walsh code vectors that if the Walsh code index is a multiple of eight the maximum run length of the vector is a multiple of sixteen. The one exception is $w_8$ which has a maximum run length of eight.

Another property of the ordering of Walsh code vectors is that the maximum run length of the vector is either four or eight if the Walsh code index is a multiple of four but not a multiple of eight. ALL other Walsh codes have a maximum run length of four or less. Thus the Walsh codes with the largest maximum run lengths are the ones with an index that is multiple of eight.

FIG. 1 shows a block diagram representation of waveform generation system. Within waveform generation system summing circuit 106 receives and combines a plurality of input signals 102A–N. Each input signal 102i is formed of a traffic channel gain {$G_i$}, a message symbol {$D_i$}, and a Walsh code bit $W_i$. The traffic channel gain {$G_i$} can be zero for inactive channels. For convenience all digital signals and waveforms are represented for a single symbol period i.

The waveform output oil waveform generation system 100 includes an in-phase component I(t) and an out-of-phase component Q(t). The output of system is applied to a high power amplifier (not shown) for transmission within the communications system of the present invention. The output of waveform generation system can be expressed as:

$$r(t)=I(t)\cos(2\pi f_c t)-Q(t)\sin(2\pi f_c t)$$

The envelope of the signal r(t) is:

$$A(t)=\sqrt{I^2(t)+Q^{2(t)}}.$$

The output signal of waveform generation system 100 can also be expressed as:

$$I(t) = \sum_{i,n} G_i d_i a_n W_i[n] h(t-nT)$$

$$Q(t) = \sum_{i,n} G_i d_i b_n W_i[n] h(t-nT)$$

where T is the chip interval. Combining the above representations produces:

$$A^2(t) = \sum_{i_1,i_2} \sum_{n_1,n_2} G_{i_1} G_{i_2} d_{i_1} d_{i_2} (a_{n_1} a_{n_2} + b_{n_1} b_{n_2}) \quad \text{Eqn. (1)}$$

$$W_{i_1}[n_1] W_{i_2}[n_2] h(t-n_1 T) h(t-n_2 T)$$

$h(t-n_1 T)h(t-n_2 T)$ is very small when $|n_1-n_2| \geq 2$. Additionally, $h(t-n_1 T)h(t-n_2 T)$ is relatively insensitive to which Walsh code vectors are used. Thus, the envelope squared $A^2(t)$ set forth in Eqn. (1) can be expressed as a sum of three terms as follows:

$$A^2(t) \approx \sum_{i_1,i_2} 2 \cdot G_{i_1} G_{i_2} d_{i_1} d_{i_2} \sum_{n_1} W_{<i_1,i_2>}[n_1] \quad \text{Eqn. (2)}$$

$$(h(t-n_1 T))^2 + \sum_{i_1,i_2} \sum_{n_1} (a_{n_1} a_{n_1+1} + b_{n_1} b_{n_1+1})$$

$$G_{i_1} G_{i_2} d_{i_1} d_{i_2} W_{<i_1,i_2>}[n_1] W_{i_1}[n_1] W_{i_1}[n_1+1]$$

$$h(t-n_1 T)h(t-n_1 T-T) +$$

$$\sum_{i_1,i_2} \sum_{n_1} (a_{n_1} a_{n_1-1} + b_{n_1} b_{n_1-1}) G_{i_1} G_{i_2} d_{i_1} d_{i_2}$$

$$W_{<i_1,i_2>}[n_1] W_{i_1}[n_1] W_{i_1}[n_1+1]$$

$$h(t-n_1 T)h(t-n_1 T+T)$$

where $W_{<i_1,j_2>}$ is the Walsh code word that is the componentwise product of the vector sets $W_i$ and $W_j$.

The first term on the right side of Eqn. (2) is by far the dominant term. It does not depend upon which Walsh code is assigned. It depends only upon the product of each pair of assigned Walsh codes or, in the binary domain, upon the sum of the assigned Walsh codes. The probability that the first term is large is much higher when several Walsh codes $W_{<i_1,i_2>}$ within the first term have a large run length. This occurs especially when the product or sum of each pair of assigned codes is a multiple of eight. It is a property of the standard indexing of Walsh code vectors that vectors having indices that are a multiple of eight have run lengths that are a multiple of eight.

If $W_{<i_1,i_2>}$ is the same Walsh code vector for several pairs of assigned Walsh codes the first term of Eqn. (2) tends to be large. At chip sampling times the second and third terms of Eqn. (2) vanish if h(t) is a Nyquist filter. Thus, is likely that more peaks occur at times other than the chip sampling times. The second and third terms Eqn. (2) are relatively insensitive to the specific Walsh codes. The peak to average ratio also depends on the traffic channel gains. Furthermore, according to Eqn. (2) the peak to average ratio tends to be maximum when the active channel gains are approximately equal. As the active channel gains become greatly uneven, the peak to average ration tends to reduce somewhat.

Thus, based upon the foregoing, it appears that the primary determinant of the peak to average ratio in not the particular Walsh codes assigned. Rather, it appears that the primary determinant is the run length of the product of each pair of Walsh codes. Furthermore, it appears that the peak to average ratio is high if Walsh codes with indices that are a multiple of eight appear often in products of pairs of assigned Walsh codes.

In accordance with the method of the present invention permuting occurs after the combining that is performed by summing circuit 106. Thus the output of summing circuit 106 is applied to permuting block 208 to perform the permuting operations described herein. The permuted output of permuting block is applied to mixers 114, 124 for mixing with signals 110, 120, respectively.

The waveform output of waveform generation system thus includes an in-phase component I(t) at; the output of transform 216 and an out-of-phase component Q(t) at the output of transform 126. The output of system is applied to a high power amplifier (not shown) for transmission within the communications system of the present invention.

Figure 2:
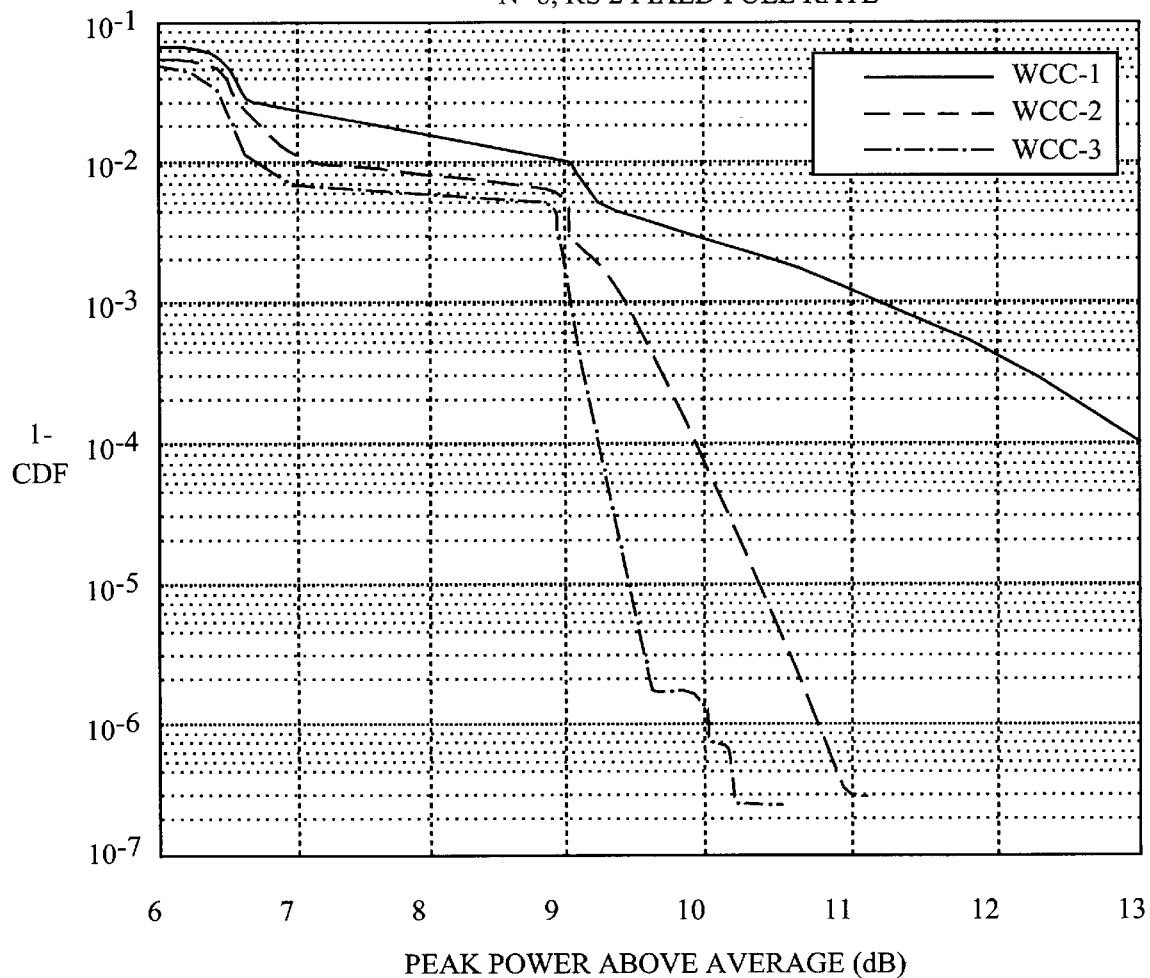
FIG. 2 shows a graphical representation of a comparison of the peak to average ratio of a plurality of different Walsh code sets.

FIG. 2 shows graphical representation 300 that compares the peak to average ratio at equal channel gains and the peak to average ratio at highly unequal channel gains. Graphical representation 300 is a 1-CDF wherein N=8, RS 2 fixed full rate, where CDF is a cumulative distribution function In order to make this comparison a simulation is performed with a plurality of Walsh code sets using only the Walsh codes set forth hereinbelow. No overhead channels are considered. Furthermore, all traffic channels are assumed to have the same traffic channel gain.

Figure 3:
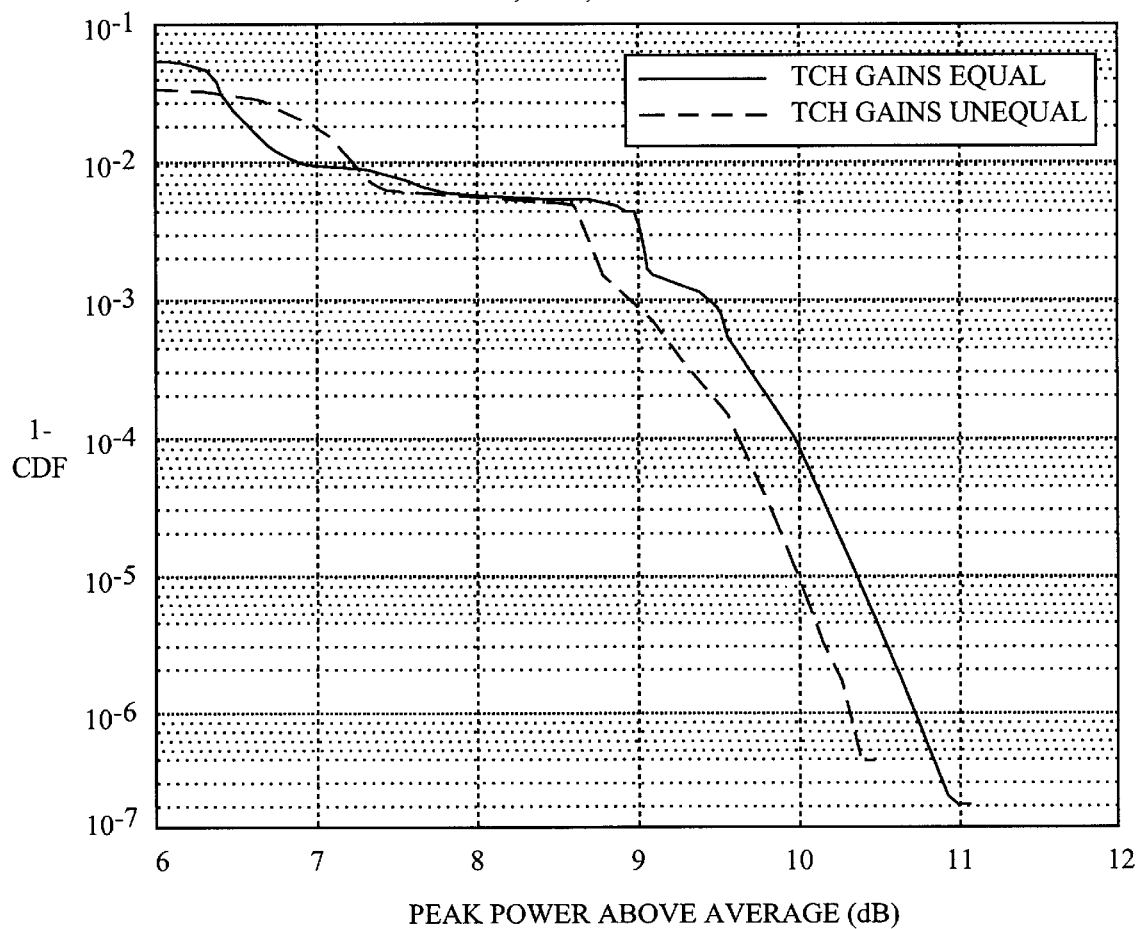
FIG. 3 shows a graphical representation of a comparison of the peak to average ratio at equal channel gains and the peak to average ratio at highly unequal channel gains for a plurality of Walsh code sets.

The following three sets of Walsh codes are used in the simulation of graphical representation 300. Each of the three sets contains eight Walsh codes. (1) WCC-1={1, 9, 17, 25, 33, 41, 49, 57}. Thus, in accordance with WCC-1, the product of every pair of Walsh codes used in the simulation has an index that is a multiple of eight. (2) WCC-2={0, 1, 2, 4, 8, 9, 10, 12}. Thus, a moderate number of pairs of Walsh codes used in the simulation have a binary sum with an index that is a multiple of eight. (3) WVCC-3 32 {0, 1, 2, 3, 4, 5, 6 7}. Thus, no pair of Walsh codes set forth in graphical representation 300 has a binary sum with an index that is a multiple of eight. Thus, FIG. 3 illustrates that the peak to average obtained using WCC-1 is much higher than the peak to average obtained using WCC-2. WCC-2, in turn, provides a peak to average that is higher than the peak to average obtained using WCC-3. These results are consistent with the results set forth above.

Thus three rules are provided for approximately determining the peak to average ratio properties of a set of Walsh codes of fixed size as follows. Rule I is directed to sets of codes having a higher number of pairs of binary Walsh code vectors whose modulo 2 sum is a Walsh code with an index that is a multiple of eight. Such sets of code vectors are expected to have a higher peak to average ratio.

In accordance with Rule I, Rule II is directed to cases wherein there is a higher frequency of occurrence of each Walsh code as the product of pairs of Walsh codes in the set. These cases also correspond to a higher peak to average ratio. Based upon the simulations it is believed that Rule I is more important than Rule II.

Rule III is directed to cases wherein there is a higher product of traffic channel gains for a pair of active binary Walsh code vectors, the sum of which gives a Walsh code with an index that is a multiple of eight. In such cases the pair of binary Walsh code vectors makes a higher contribution to the peak to average ratio other pairs. For example, the pilot channel is assigned Walsh code zero and a high channel gain. A traffic channel can then be assigned a Walsh code with an index that is a multiple of eight. The contribution of this pair of codes to the peak to average ratio is more significant For example, the contribution of this pair is more significant than the contribution of a pair of Walsh codes with a binary sum that is a Walsh code with an index that is a multiple of eight.

FIG. 3 show graphical representation 400 for comparing the peak to average ratio in the case of equal channel gain along with highly unequal channel gain. Graphical representation 400 is a 1-CDF plot with different transmit channel gains. The Walsh code set used in the simulation of graphical representation 400 is WCC-2. As previously described with respect to graphical representation 300, N=8, RS2, and fixed full rate. Thus, graphical representation 400 illustrates that if the traffic channel gains are approximately equal the peak to average tends to be higher than if they are unequal.

FIGS. 4A–E show a block diagram representation of biased bin balancing algorithm 500. When Walsh codes are assigned to new calls within a communications system according biased bin balancing algorithm 500, the occurrence of large peaks in the transmit power level of the combined signals is reduced to one tenth of a percent. This should be compared with an occurrence of approximately one percent using a random Walsh code assignment method.

Computations involving Walsh codes performed during the execution of biased bin balancing algorithm 500 can be performed using the teachings set forth herein. The execution of biased bin balancing algorithm 500 can be performed in a call resources database management unit at the base station. A structure useful in performing biased bin balancing algorithm 500 is referred to as a Walsh code control block. This data structure can be maintained at the base station.

Biased bin balancing algorithm 500 is based primarily upon Rule I. It is also partially based upon Rule III. The significance of Rule II is believed to be in providing a possible alternate embodiment. Furthermore, Rule III is limited to the case wherein the pilot channel gain and paging channel gain (and any other overhead channel gain, if applicable) is higher than the channel gain of remaining channels. Biased bin balancing algorithm 500 is adapted to assign a Walsh code to a new user, either an originating call or a handoff, of a communication system in a way that the binary sum of the Walsh code with the minimum possible currently active Walsh codes has an index that is a multiple of eight and to partially incorporate Rule II. In accordance with the method of the present invention a new call is assigned a Walsh code immediately upon request provided that the resources for doing so are available. Updates to the Walsh code control block are carried out immediately after a user is assigned or unassigned a Walsh code.

The Walsh code control block contains bins, or data structures $v_0$, $v_1$, $v_2$, $v_3$, $v_4$, $v_5$, $v_6$, $v_7$ for storing information about Walsh codes. A Walsh code belongs to the bin $v_i$ if its index modulo 8 is i. Furthermore, a Walsh code is said to be active in the bin $v_i$ if it belongs to bin $v_i$ and is currently assigned to an active traffic channel or an overhead channel. Otherwise, the Walsh code is said to be inactive. Each bin $v_i$ stores an indication of each Walsh code that belongs to it, including Walsh codes assigned to traffic charnels and to overhead channels. The total number of active Walsh codes in the bin $v_i$ is represented as bin_value.

For example, the bin_value of a bin $v_i$ can include the number of assigned Walsh code indices from the set $\{w_2, w_{10}, w_{18}, w_{26}, w_{34}, w_{42}, w_{50}, w_{58}\}$. The bin capacity, or maximum bin_value, of bin $v_i$ is therefore eight. The bin capacity can be verified by noting that the modulo 2 sum of any two binary Walsh code vectors belonging to the same bin is a multiple of eight and that the sum of any two binary Walsh code vectors belonging to different bins is not a multiple of eight. Thus, the bin $v_i$ has the bin_label that is equal to i.

The Walsh code control block also contains an integer variable cycle. Each Walsh code with indices 8i through 8i+7 is defined to have cycle i. Thus, with a Walsh code size of sixty-four, the values of cycle are between zero and seven. A Walsh code is uniquely determined by specifying its cycle and its bin_label values. The Walsh code control block contains an integer array WC_assign which is of the form:

WC_assign=[current_cycle,current_bin_label]

wherein current_cycle is of the type cycle, and current_bin_label is of the type bin_label. The array WC_assign points to the cycle and bin_label of the Walsh code that is currently available for assignment to the next call request.

In the initial state of the method of the present invention there are no traffic channels. In this state the bin $v_0$ includes only the pilot channel and the synchronization channel and therefore for bin $v_0$ bin_value=2. Additionally, the bin $v_1$ includes only the paging channel and therefore for bin $v_1$ bin_value =1. All other bins are set with bin_value=0. Additionally, current_cycle is set to zero and current_bin_label is set to two.

Figure 5:
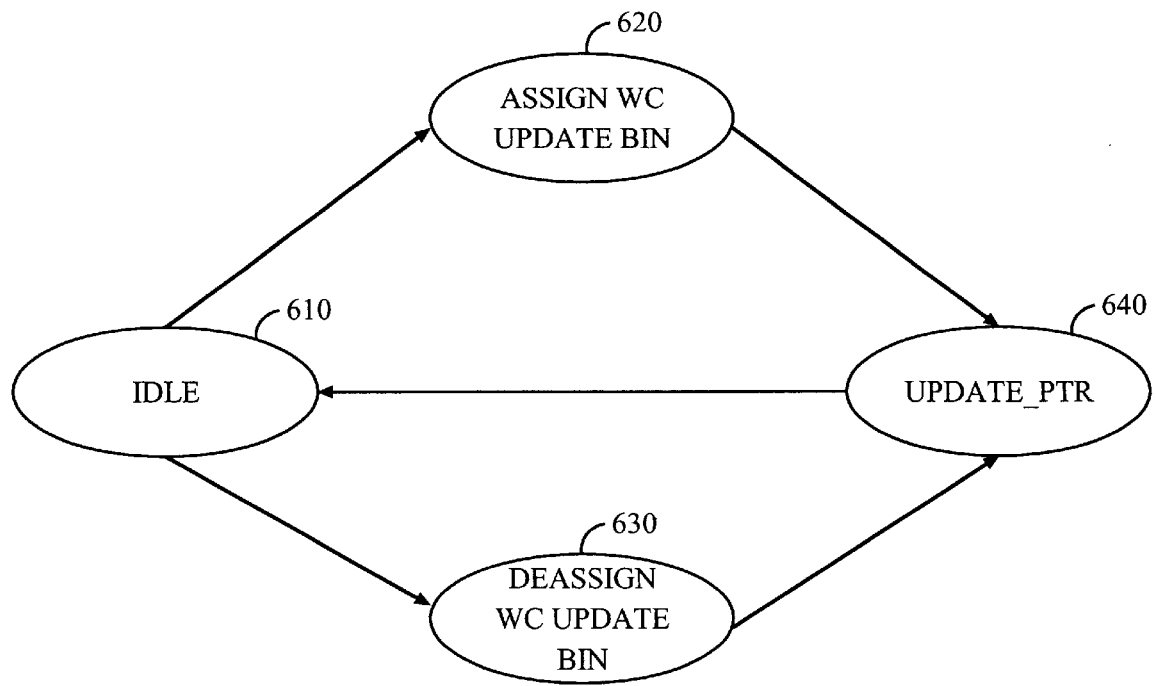
FIG. 5 shows a state diagram representing the states of the method of the present invention.

FIG. 5 shows Walsh code assignment state diagram 600. Walsh code assignment state diagram 600 represents a process performed in accordance with the present invention and includes a total of four states. Transition from idle state 610 of assignment state diagram 600 is controlled by two binary variables, new_user_arrives and old_user_departs. The two binary variables are set to a value of TRUE when a new user, either an originating or a handoff, requests a Walsh code channel or an old user is unassigned a Walsh code channel, respectively.

When new_user_arrives becomes TRUE the process of state diagram 600 leaves idle state 610 and enters assign Walsh code update bin state 620. In state 620 the Walsh code referenced by the current value of WC_assign is assigned to the user making the request. The assigned Walsh code is set to active in the bin having the label current_bin_label. The bin_value of the bin with the label current_bin_label is incremented. A state transition from state 620 to update_ptr state 640 then occurs within state diagram 600.

When old_user_departs becomes TRUE the process of state diagram 600 leaves idle state 610 and enters unassign Walsh code update bin state 630. In state 630 the Walsh code of the departing user is unassigned. The unassigned Walsh code is set to inactive in the bin where it had been previously been assigned. The bin_value of the bin is decremented. A state transition from state 630 to update_ptr state 640 then occurs within state diagram 600.

Biased bin balancing algorithm 500 sets forth the operations performed in accordance with the present invention within update_ptr state 640 of Walsh code assignment state diagram 600. In one preferred embodiment of the invention the bins are loaded uniformly. This provides a substantial improvement over random assignment of the Walsh codes with respect to peak to average ratio. However, further improved performance can be obtained by biasing the loading of the bins somewhat. For example, it is preferred to give the least preference to the bin $v_0$ because the bin $v_0$ carries the pilot signal which has a high gain. Furthermore, the bin $v_1$ receives less preference than bins $v_2$ through $v_1$ because the bin $v_1$ contains the paging channel.

In biased bin balancing algorithm 500 a determination is made which of the bins between $v_0$ and bin $v_7$ contain the minimum number of assigned active Walsh codes as shown in block 505. For example, if bins $v_2$ and $v_3$ contained three active Walsh codes and the remainder of the bins contained more than three, the operations of block 505 would return bins $v_2$ and $v_3$. The bins containing the minimum number of assigned active Walsh codes in the subset of bins consisting of bins $v_2$ through $v_7$ is then determined as shown in block 510.

Execution of biased bin balancing algorithm 500 then proceeds to decision 515 where a determination is made with respect to the number n of bins between bins $v_2$ and $v_7$ that was determined in block 510. If n=1 execution of biased bin balancing algorithm 500 proceeds from FIG. 4A to FIG. 4B by way of off-page connector 519 and on-page connector 521. Since only a single bin has the minimum number of active codes in this case, biased bin balancing algorithm 500 merely selects one of the available inactive codes in the single bin as shown in block 520. As shown in block 525 the selected code is assigned to the new call. The current cycle is incremented as shown in block 530 and execution of balancing algorithm 500 proceeds to exit 535. If more than one bin between bin $v_2$ and bin $v_7$ has the minimum number of active Walsh codes, as determined by decision 515, execution of biased bin balancing algorithm 500 proceeds from FIG. 4A to FIG. 4C by way of off-page connector 518 and on-page connector 551.

When this path is taken algorithm 500 attempts to assign the lowest index Walsh code that is available in one of the bins with the minimum number of active codes as shown in block 550. Thus the Walsh codes can be divided, for example, into eight consecutive cycles according to their index modulo 8. Only if no inactive Walsh codes are available within the cycle indicated by the current-cycle pointer is a Walsh code from the next cycle used as shown in block 560. The selected Walsh code is then assigned to the new call as shown in block 570. Execution then exits by way of exit terminal 575.

Figure 4A:
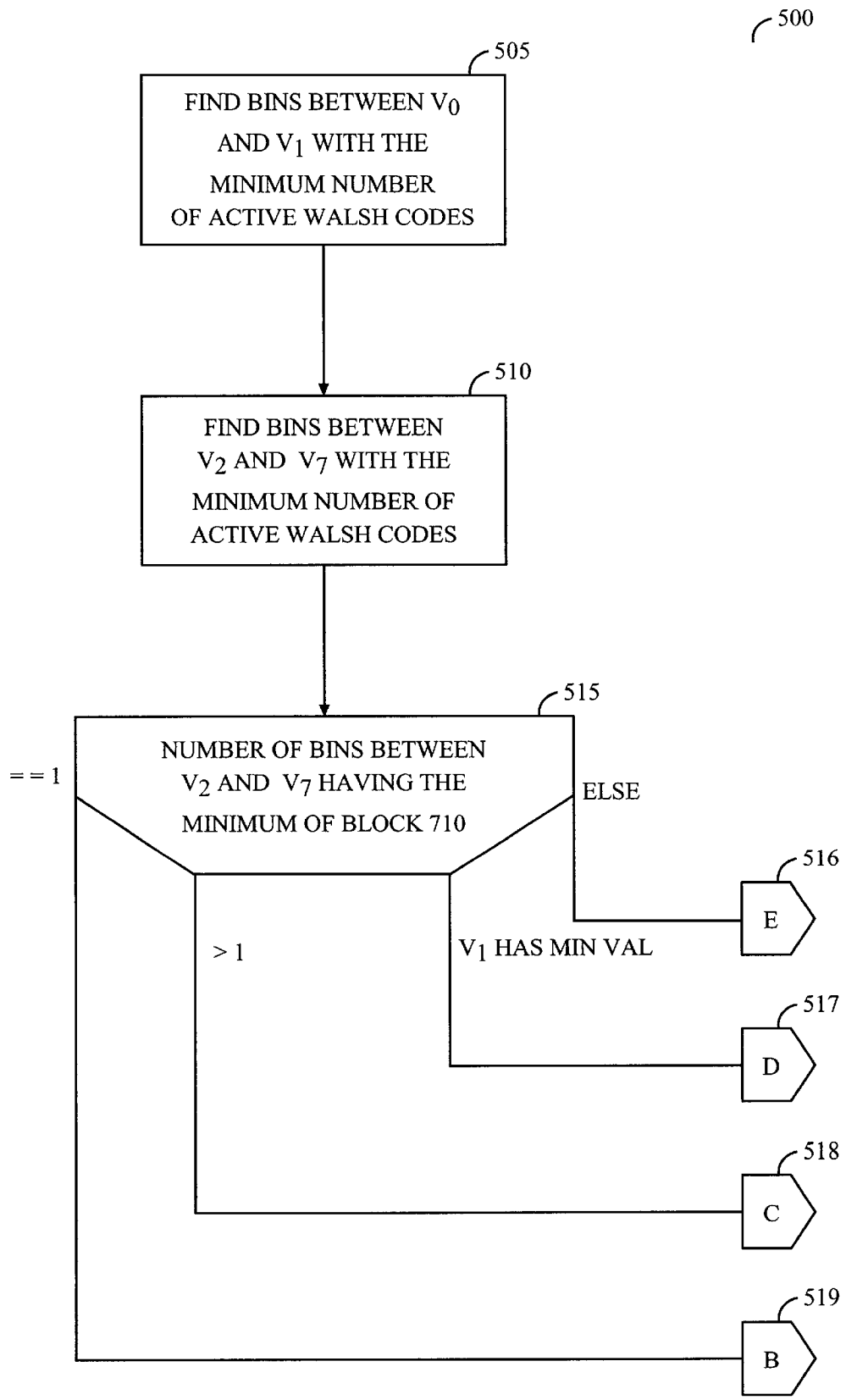
FIGS. 4A–E show flow chart representation of the biased bin balancing algorithm of the present invention.
Figure 4B:
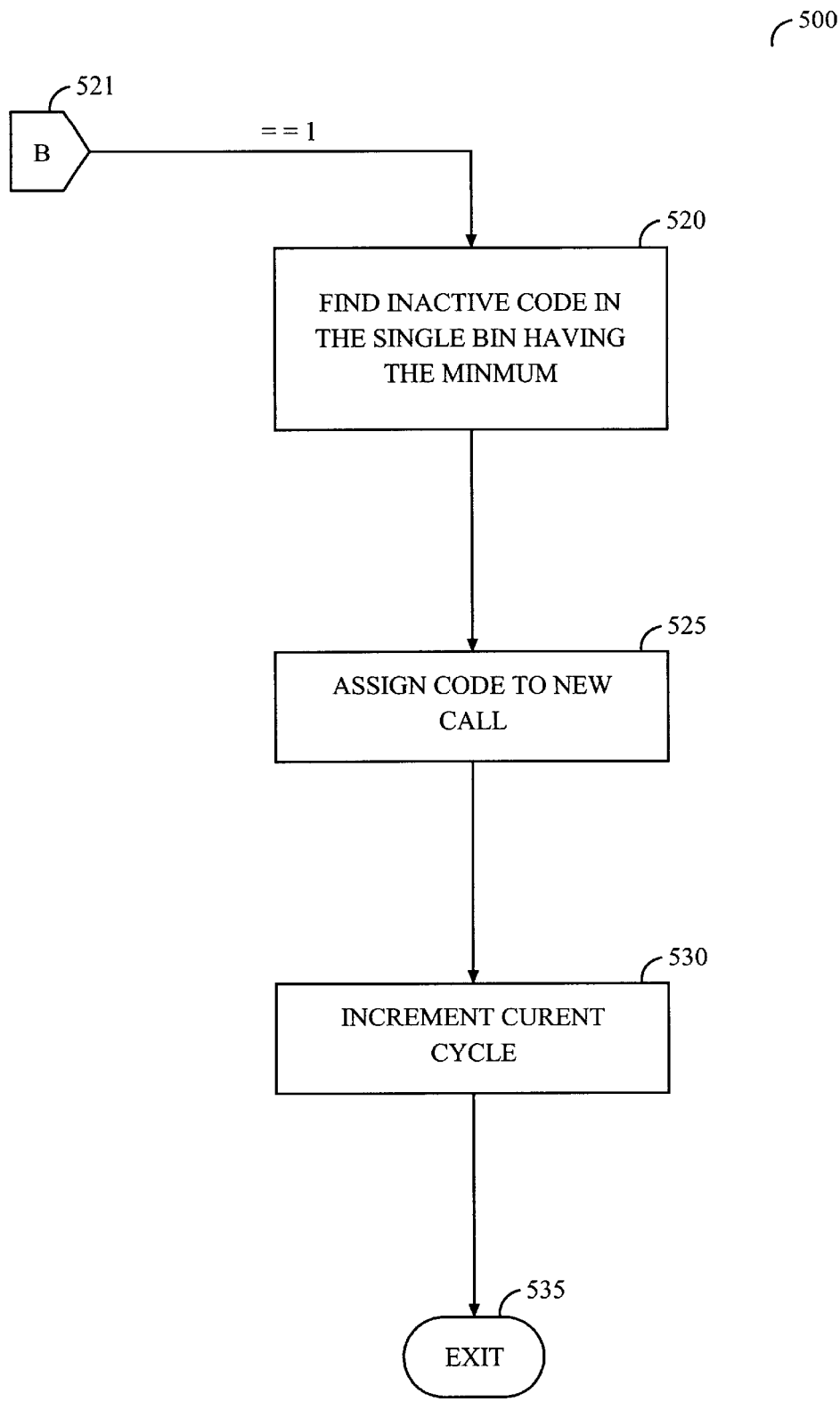
Figure 4C:
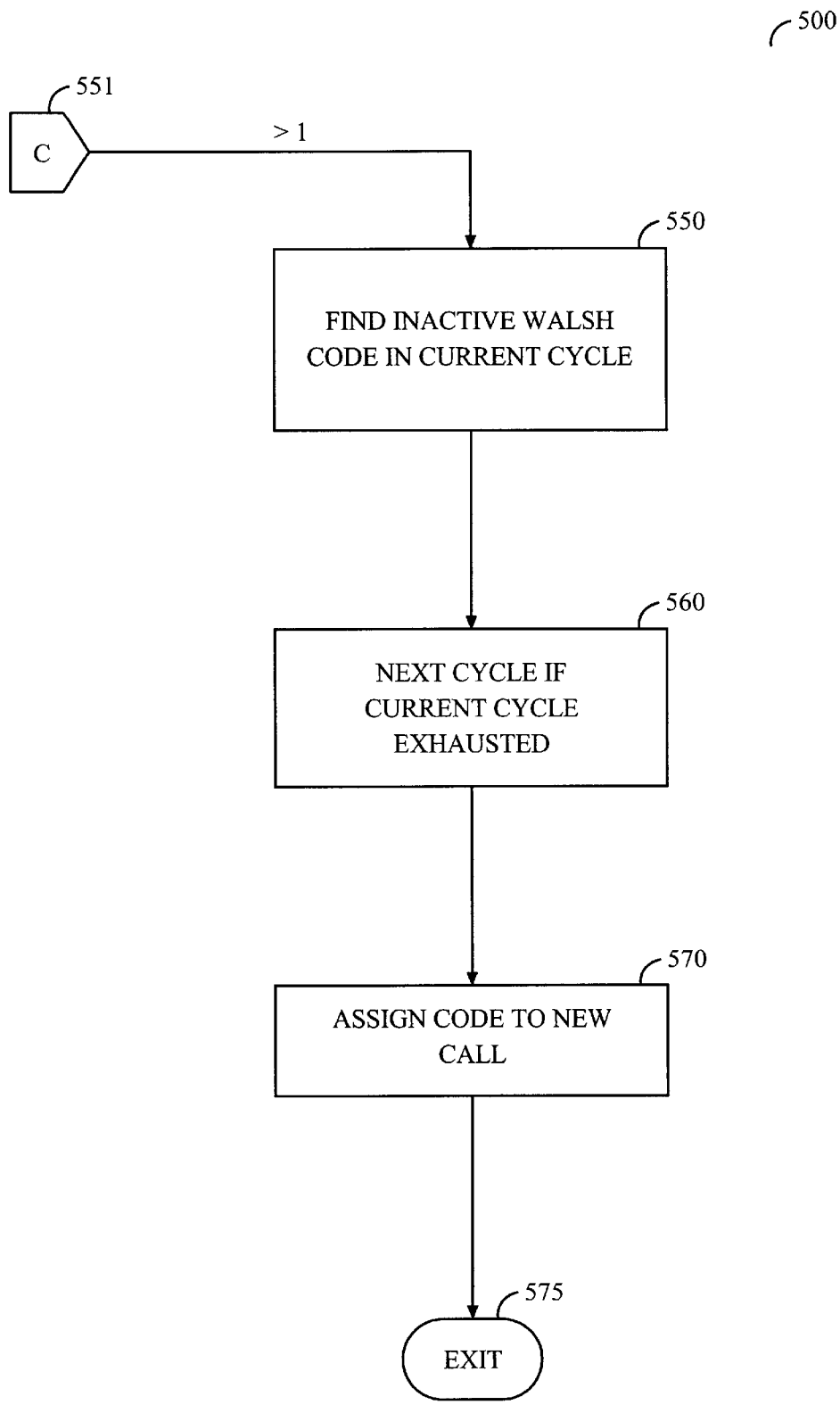
Figure 4D:
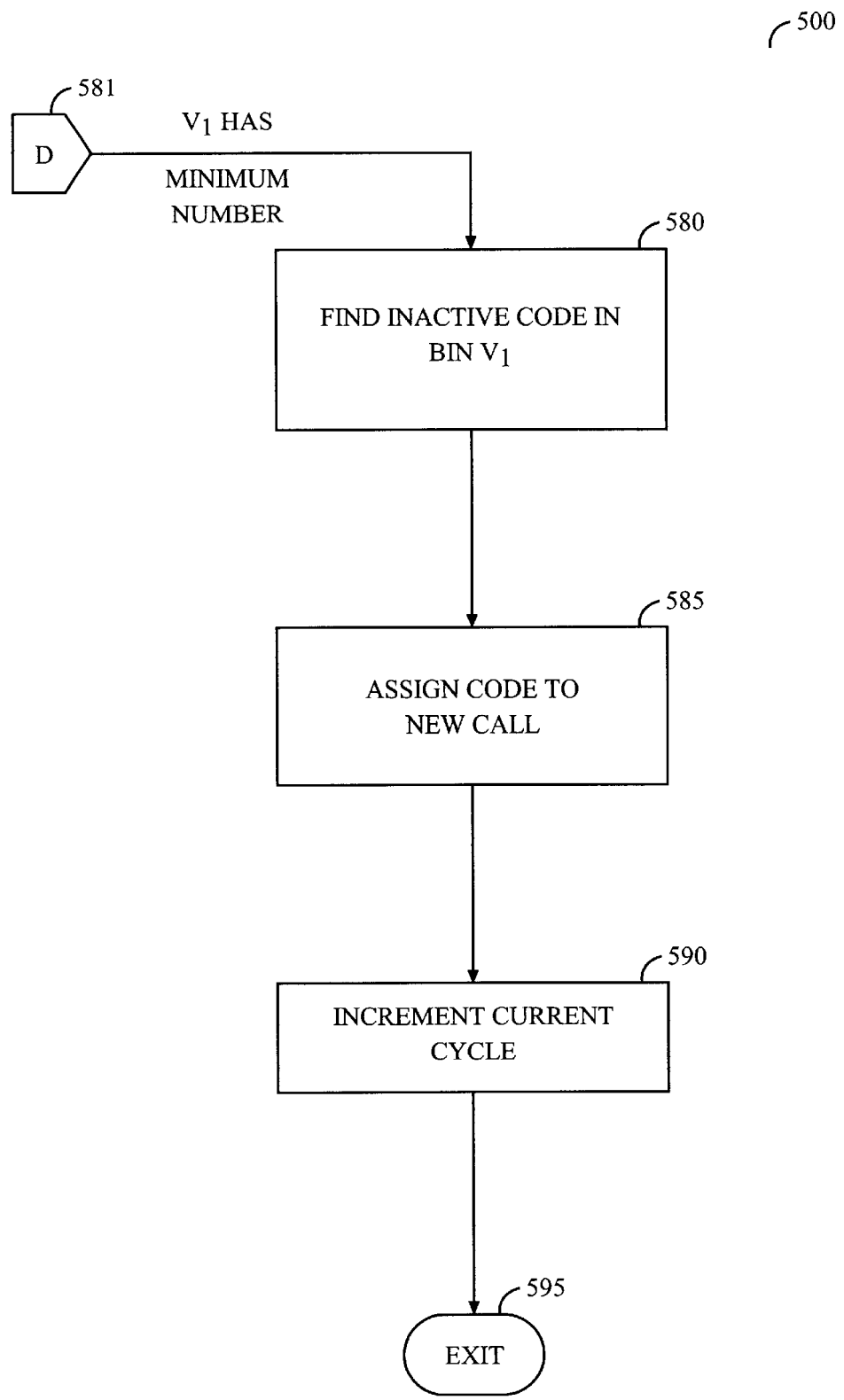

If the bin $v_1$ has the minimum number of active Walsh codes, as determined by decision 515, execution of biased bin balancing algorithm 500 proceeds to FIG. 4D by way of off-page connector 517 and on-page connector 581. The path of off-page connector 517 is not taken unless neither of the paths of off-page connectors 518, 519 is taken. In this manner algorithm 500 is biased against bin $v_1$ as previously described. An inactive Walsh code is located in bin $v_1$ as shown in block 580. The located Walsh code is assigned to the new call as shown in block 585. In block 590 the current cycle is incremented and execution proceeds to exit 595.

Figure 4E:
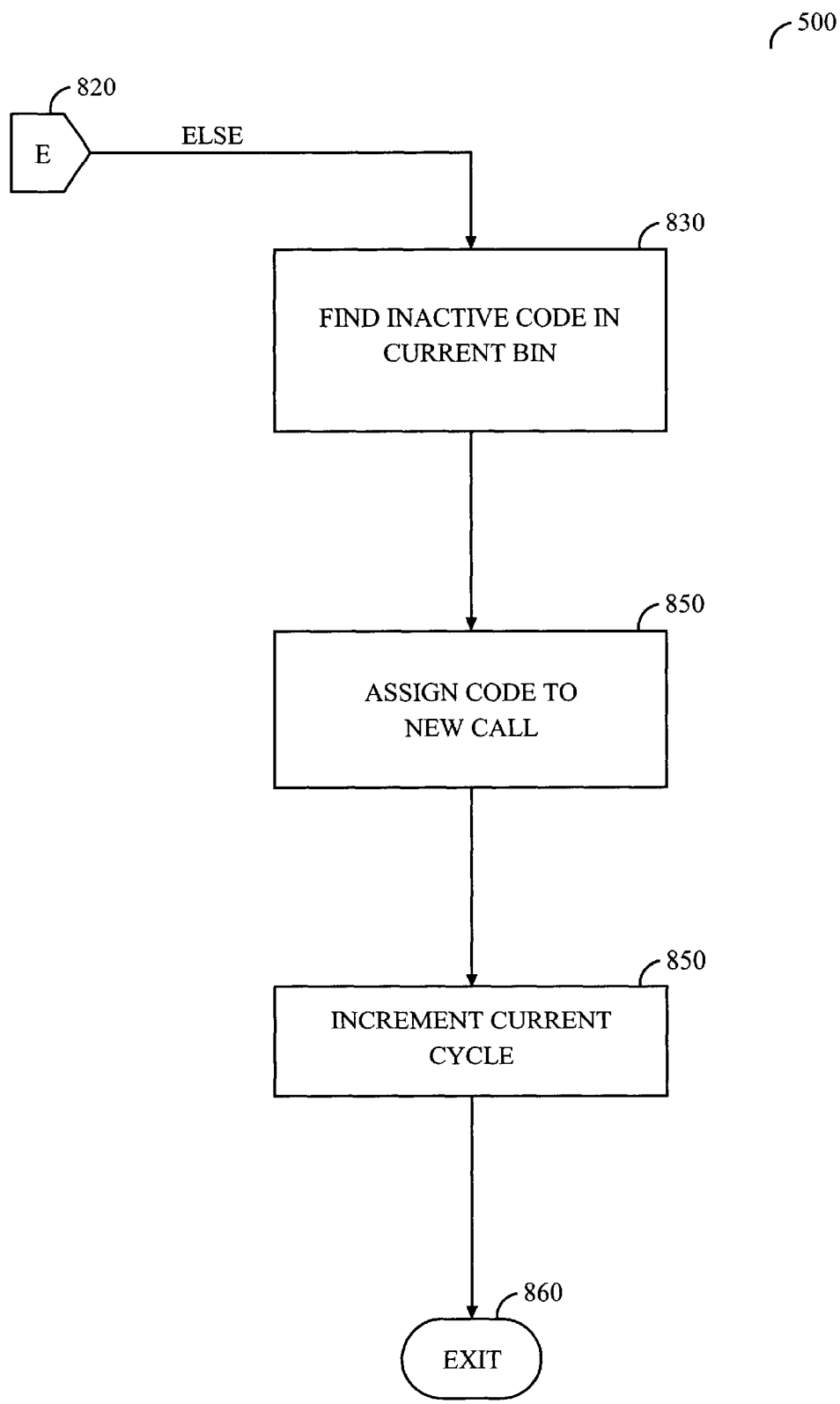

When execution of biased bin balancing algorithm does not proceed from decision 515 by way of any of the other paths, it proceeds to FIG. 4E by way of off-page connector 516 and on-page connector 820. An inactive code is then found in the current bin as shown in block 830 and assigned to the new call as shown in block 840. The current cycle is incremented as shown in block 850 and execution exits algorithm 500 by way of exit 860.

A more detailed description of biased bin balancing algorithm 500 is set forth in Table I. The representation of Table I is a conventional pseudocode representation understood by those skilled in the art.

```
Compute the set min_bin = {bins with minimum bin value}.
Compute the set min_bin_sub = {v_i 1 v_i = ∈ min_bin,2≤i≤7}.
If (1 min_bin_sub 1 ==1)
    For (i=0; ++i;i<8)
        If         (Walsh      code      at
[min_bin_sub_label,current_cycle+i] is inactive)
            Set    WC_assign    =   [current_cycle+i,
min_bin_sub_label];
            set current_cycle = current_cycle +i; exit;
Elseif (1 min_bin_sub 1 >1)
For (i=0; ++i;i<8)
    {Set     current_cycle   =    min{I    lww    at
[min_bin_sub_,current_cycle+i] is inactive}
Set current_bin_label = min{bin_label 1 corresp. bin ∈ w
at min_bin_sub,WC at
            [current_cycle, bin_label] is
inactive}
    Set WC_assign = [current_cycle,current_bin_label];}
Elseif (v_1∈ min_bin)
For (i=0;++i; i<8)
    If (Walsh code at [current_cycle+i,1] is inactive);
        Set WC_assign = [current_cycle+i,1];
        set current_cycle = current_cycle +i; exit;
Else
    For (i=0;++i; i<8)
        If (Walsh code at [current_cycle+i,0] is inactive);
            Set WC_assign = [current_cycle+i,0];
            set current_cycle = current_cycle +i; exit;
```

In an example of the operation of biased bin balancing algorithm 500 only the pilot, paging and sync channels are active. They have Walsh codes 0, 1 and 32 respectively. Thus, bins $v_0$ and $v_1$ have a bin_value of two and one, respectively, and all other bins have bin_value=0. Although it is believed that the primary benefit of the system of the present occurs in a dynamic communication system, an assumption is made that each new call requiring a Walsh code is active for a long period of time. Thus, in this example, once a Walsh code is assigned it is not unassigned. Under these conditions, biased bin balancing algorithm 500 provides the following sequence:
2,4,5,6,7,10,11,12,13,14,15,9,18,19,20,21,22,23,17,8,26,27, . . .

Two principles upon which biased bin balancing algorithm 500 is based are as follows. First, different Walsh code assignments corresponding to any single bin configuration exhibit approximately the same peak to average ratio. The bin values corresponding to specific Walsh code assignment can be referred to as the bin configuration of the corresponding set of assigned Walsh codes. Secondly, as the imbalance in the bins in a bin configuration increases the peak to average ratio increases.

In order to test the first principle the bin configuration of Table II is provided. In this configuration there are eight active traffic channels. The pilot, paging and synchronization channels are assigned Walsh codes 0, 1, 32, respectively.

TABLE II

| $v_0$ | $v_1$ | $v_2$ | $v_3$ | $v_4$ | $v_5$ | $v_6$ | $v_7$ |
|---|---|---|---|---|---|---|---|
| 2 | 1 | 2 | 2 | 1 | 1 | 1 | 1 |

Figure 6:
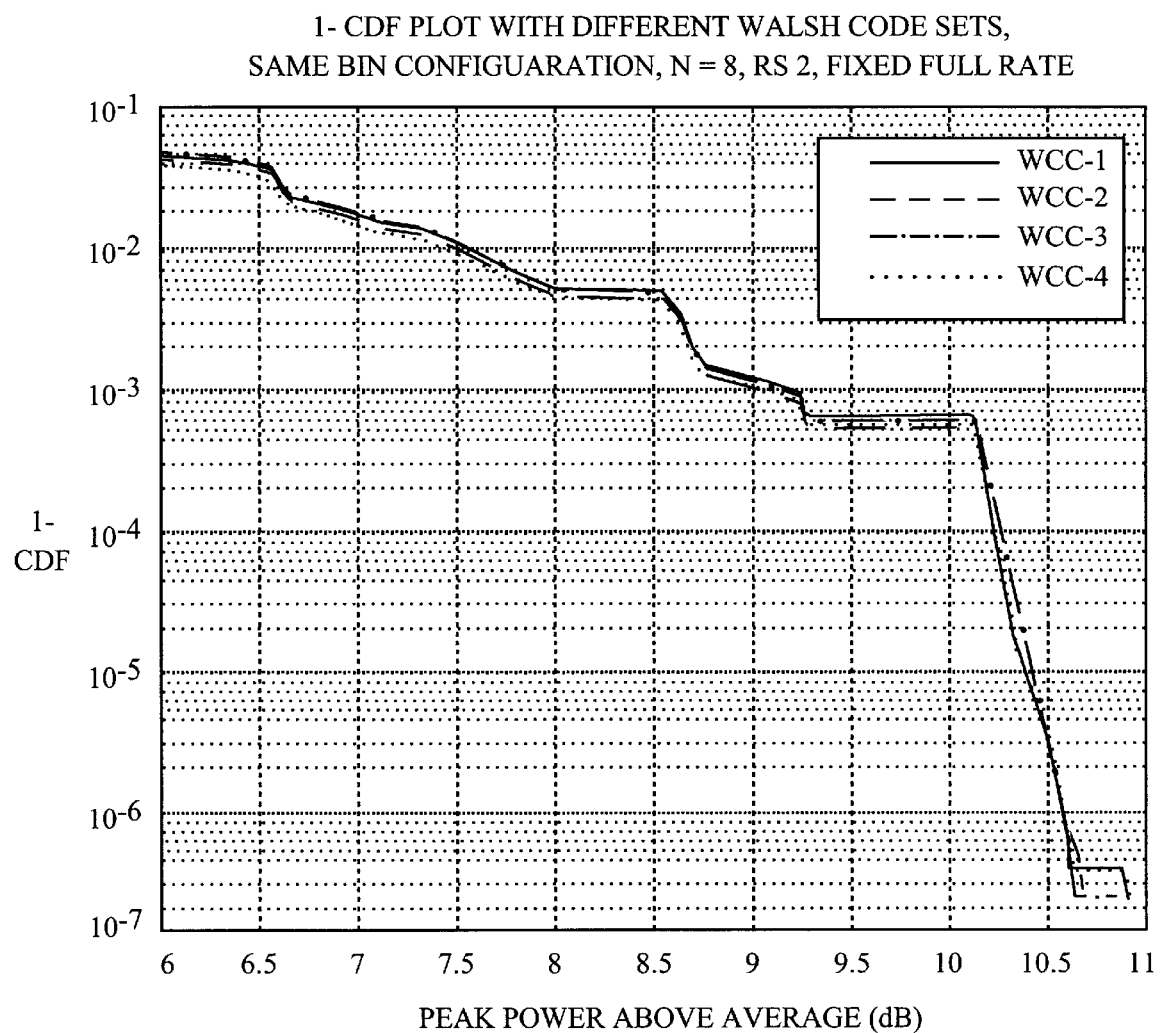
FIGS. 6–8 show graphical representations of comparisons of the effects of differing assignments of Walsh code vectors.

FIG. 6 shows graphical representation 900 that compares the peak to average ratio for different Walsh code assignments with the same bin configuration as shown in Table II. Graphical representation 900 is a 1-CDF plot, N=8, RS2, fixed full rate. The Walsh code assignments for the active traffic channels are:

WCC-1={2,3,4,5,6,7,10,11}
WCC-2={2,3,12,13,22,23,42,43}
WCC-3={2,11,20,29,38,47,58,3}
WCC-4={2,3,4,5,38,39,42,43}.

The peak to average ratios for the Walsh codes of graphical representation 900 are very close together. The slight increase in the peak to average ratio of WCC-3 is believed to be related to Rule III above.

In order to test the second principle set forth above a case is considered wherein there are fourteen active traffic channels and the pilot, paging, and synchronization channels are assigned Walsh codes 0, 1, 32, respectively. A series of Walsh code sets and bin configurations are set forth below as Table III. The WCC-1 case is substantially balanced. The imbalance is increased in WCC-2 case and the imbalance in the WCC-3 case is further increased. The imbalance in the WCC4 case is maximum.

Figure 7:
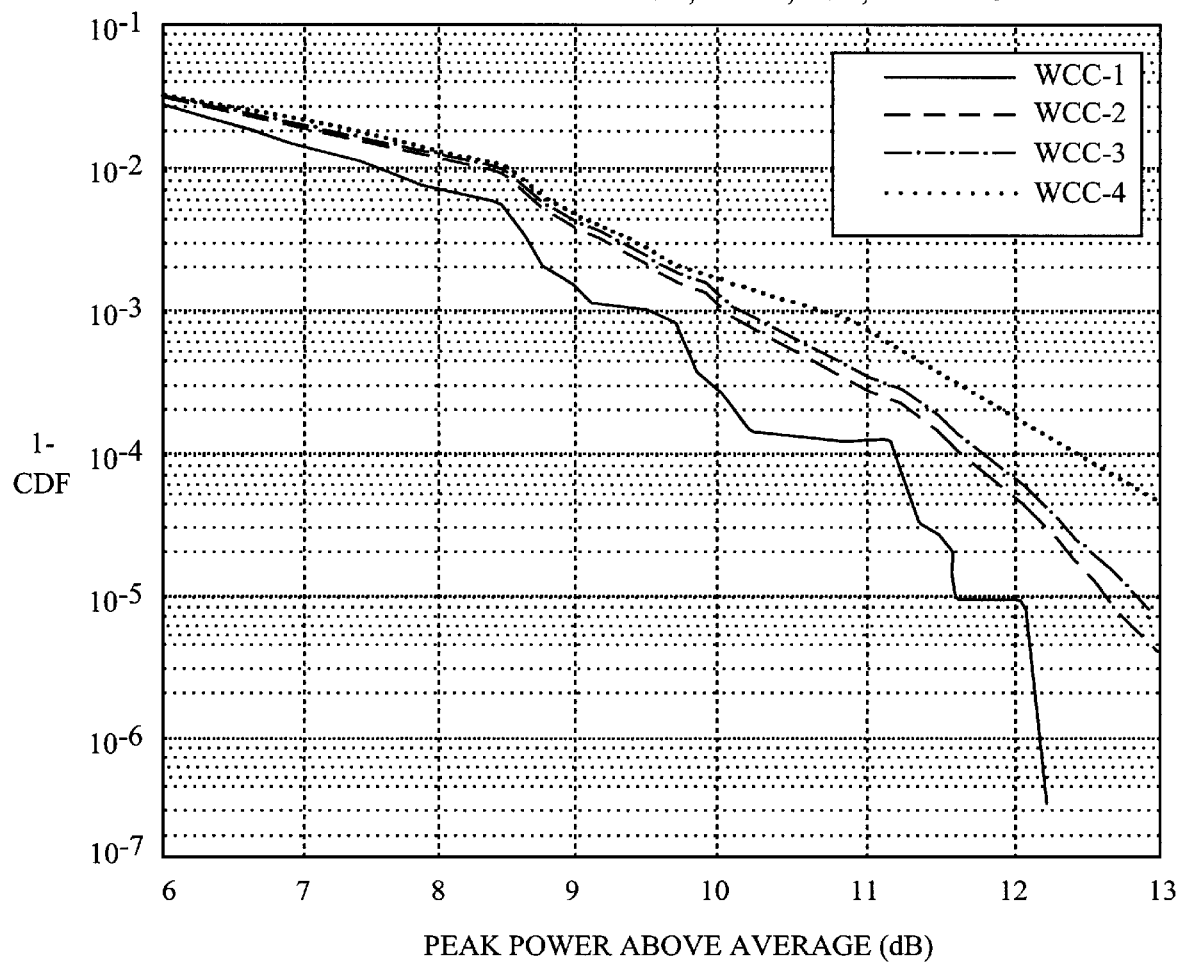

FIG. 7 shows graphical representation 1000 illustrating the peak to average ratio of the Walsh code sets of Table III. In accordance with the waveforms of graphical representation 1000 the peak to average ratios of the Walsh code sets increase as the bin imbalance increases.

Further to Rule IV above, the peak to average ratio also depends on the traffic channel gains. Thus, in an alternate embodiment of biased bin balancing algorithm 500 the bin_value of each bin can contain the traffic channel gains corresponding to the Walsh codes belonging to the bin. Two methods of updating the bin values using the traffic channel gains can be used in accordance with this alternate embodiment in order to improve performance.

One method is to use the traffic channel gains only immediately after assigning or unassigning Walsh codes and accordingly set WC_assign. The other method is to periodically update the bins and accordingly set WCassign. The latter method can yield somewhat improved performance, since the traffic channel gains vary dynamically during system operation. However, this results in increased complexity. The state update_ptr of update pointer state diagram 600 is not affected by this alternate embodiment.

In a further alternate embodiment the probability of several pairs of Walsh summing up to give the same Walsh code or codes is limited. This alternate embodiment is provided in accordance with Rule II above. In this embodiment only the state update_ptr is affected. To perform algorithm 500 in accordance with this embodiment, the variable current_cycle is incremented by at least one after every code channel assignment within the update_WC_assign( ) procedure. Thus the opening loop statement For (i=0; ++i; i<8) in Table I is changed to For (i=1; ++i; i<8).

When blocks of code channels; are assigned at the same time modifications can be made to biased bin balancing algorithm 500. Block assignments can occur, for example, when multiple data rate is supported, where multiple data rate refiers to the assignment of multiple code channels at the same time. The array WC_assign can be of the form:

WC_assign={current_cycle_2, current_bin_label_1, . . .
    current_cycle_M, current_bin_label_M} where M is the maximum number of code channels that can be assigned at a time.

A further alternate embodiment is provided by the fact Walsh code words having an index that is a multiple of four also have a relatively larger run length, for example four or eight. If multiple bins have the minimum bin_value a Walsh code can be assigned from the bin with a useful property. A minimum number of active Walsh code words form a module 2 sum with the active Walsh code words of such a bin giving Walsh code words with indices that are a multiple of four. In order to provide this embodiment each bin v stores the sum of bin_values $v_{(j+4) \mod 8}$ and $v_{(j-4) \mod 8}$.

In order to estimate the effectiveness of biased bin balancing algorithm 500 a formula is provided. The formula is useful in approximating the probability of various unbalanced bin configurations occurring during random Walsh code assignments. As previously described, when bin imbalance occurs the peak to average ratio increases.

In this formula the total number of active and overhead traffic channels is represented as N. When the Walsh codes for all the N code channels are assigned randomly there is a probability that at least I bins contain at least M assigned Walsh codes each can be shown to be:

$$P(N, M, J) = \min\left[1, \frac{\binom{8}{J}\binom{8}{M}^J\binom{64-JM}{N-JM}}{\frac{64}{N}}\right].$$

The approximation of this probability is very good for large values of M.

Figure 8:
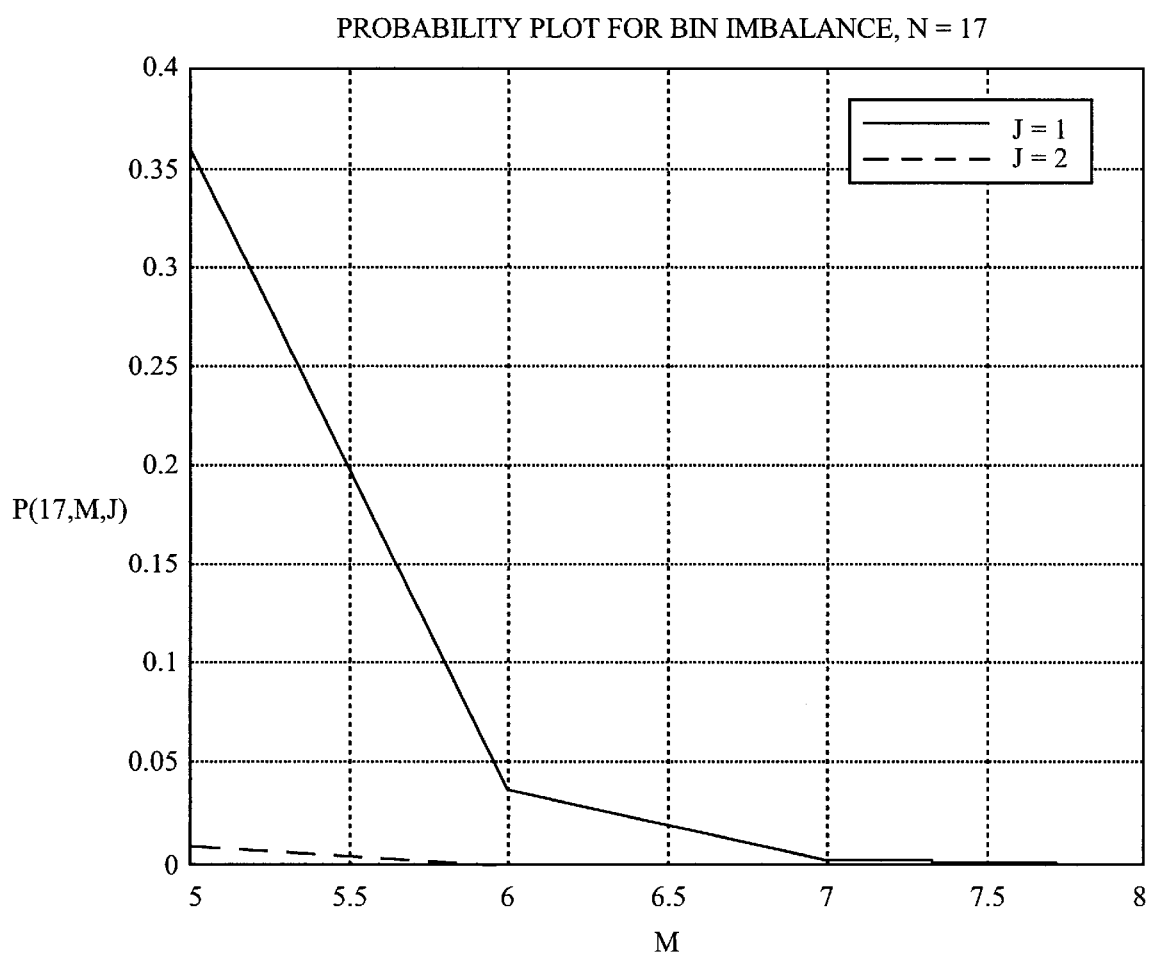

FIG. 8 shows graphical representation 1100, illustrating a probability plot for bin imbalance. The imbalance in a bin configuration if most of the assigned Walsh codes belong to a small number of bins. This corresponds to a large value of M and, possibly, a large value of j. Graphical representation 1100 shows the probability P(N, M, J) for values M and J where N=17. In another alternate embodiment, bins $v_3$ and $v_4$ can be selected randomly if they both have the same number of active Walsh codes.

The previous description of the preferred embodiments is provided to enable a person skilled in the art to make or use the present invention. The various modifications to these embodiments will be readily apparent to those skilled in the art, and the generic principles defined herein may be applied to other embodiments without the use of the inventive faculty. For example, while the disclosed method and apparatus refers to Walsh codes, it will be understood by those skilled in the art that any spreading code or signal spreading technique may be used. Thus, the present invention is not intended to be limited to the embodiments shown herein but is to be accorded the widest scope consistent with the principles and novel features disclosed.

What is claimed is:

1. A method of transmitting message signals in a communications system having new calls entering the communications system and spreading codes assigned to the new calls, comprising of the steps of:
   (a) dividing the spreading codes into bins, said bins being data structures for storing information about the spreading codes;
   (b) determining a number of active spreading codes in the bins;
   (c) selecting a spreading code in accordance with the determination of step (b); and
   (d) assigning the selected spreading code to the new call.

2. The transmission method of claim 1, wherein the spreading codes have indices and step (a) comprises dividing the spreading codes according to the indices.

3. The transmission method of claim 2, wherein the spreading codes are divided into cycles according to the indices.

4. The transmission method of claim 2, wherein the number of bins is n and the spreading codes are divided into bins in accordance with the value of their indices modulo n.

5. The transmission method of claim 1, comprising the step of determining a minimum number of active spreading codes in the bins.

6. The transmission method of claim 5, comprising the step of selecting the spreading code in accordance with the minimum number of active spreading codes.

7. The transmission method of claim 6, wherein a plurality of the bins contain the minimum number of active spreading codes, comprising the step of:
   e) selecting a bin from the plurality of bins containing the minimum number of active spreading codes; and
   f) selecting a spreading code from the selected bin.

8. The transmission method of claim 7, comprising the steps of:
   g) determining a subset of the bins containing the minimum number of active spreading codes; and
   h) selecting a first predetermined bin with a preference lower than a preference for the remaining bins of the subset of the bins.

9. The transmission method of claim 8, wherein the first predetermined bin comprises a pilot signal bin.

10. The transmission method of claim 8, comprising the step of selecting a second predetermined bin with a preference greater than the preference of the first predetermined bin and a preference less than the preference of the remaining bins of the subset of the bins.

11. The transmission method of claim 8, comprising the step of selecting a bin of the subset of remaining bins with equal preference.

12. The transmission method of claim 3, including a current cycle wherein the step of selecting a spreading code comprises selecting a spreading code within the current cycle.

13. The transmission method of claim 12, comprising the step of selecting a spreading code in a differing cycle only when no spreading codes are available in the current cycle.

14. An apparatus for transmitting message signals in a communications system having a new call entering the communications system and spreading codes that can be active and inactive, comprising:
   (a) means for dividing the spreading codes into bins, said bins being data structures for storing information about the spreading codes;
   (b) means for determining a number of active spreading codes in the bins;
   (c) means for selecting a spreading code in accordance with the determination in (b); and
   (d) means for assigning the selected spreading code to the new call.

* * * * *